United States Patent Office 3,009,957
Patented Nov. 21, 1961

3,009,957
PRODUCTION OF XYLENE DIAMINES
Karl Adam, Ludwigshafen (Rhine), Gartenstadt, Germany, assignor to Badische Anilin- & Soda-Fabrik Aktiengesellschaft, Ludwigshafen (Rhine), Germany
No Drawing. Filed Mar. 31, 1959, Ser. No. 803,092
Claims priority, application Germany Apr. 2, 1958
6 Claims. (Cl. 260—570.9)

This invention relates to a process for the production of xylene diamines by hydrogenation of phthalodinitriles, and especially by catalytic hydrogenation in the presence of cobalt catalysts containing chromium and/or manganese.

It is known to prepare the corresponding diamines by catalytic hydrogenation of aliphatic dinitriles. Thus for example hexamethylene diamine is obtained from adipodinitrile by using cobalt catalysts which have been activated with manganese or chromium. These known catalysts contain additions of about 0.5 to 10% of chromium oxide or manganese oxide. It has been found, however, that these catalysts lose their activity relatively quickly and must frequently be regenerated. A further disadvantage of these catalysts is that they require a relatively high hydrogenation temperature.

I have now found that phthalodinitriles can be hydrogenated in a simple way to the corresponding xylene diamines by treating them in dissolved form with hydrogen under increased pressure in the presence of cobalt catalysts which contain, in addition to chromium and/or manganese, a small amount of an inorganic pyro- or polyacid. For purposes of this application, the term "polyacid" will be considered as including pyro-acids. A definition of poly-acids which indicates that the term is generic and includes pyro-acids is contained in Ephraim, "Inorganic Chemistry," 4th edition, pages 500–501 (1943). Of the compounds referred to as pyro- or poly-acids, those which may be used in accordance with this invention include quite generally those compounds which are obtained by heating acids, for example sulfuric or phosphoric acid, with intramolecular dehydration and subsequent condensation.

The cobalt-containing catalysts which also contain chromium manganese and a small amount of a pyro- or poly-acid, preferably containing 5 to 30%, especially 10 to 20% of cobalt and less than 6% of chromium and/or manganese, preferably 0.03 to 5% of chromium and/or 0.1 to 2% of manganese. The content of pyro- or poly-acid is in general 0.05 to 5%, advantageously 0.3 to 1.5% by weight of acid with respect to the weight of the catalyst. The acids which may, in accordance with this invention, be used for the preparation of the catalysts are all those acids which on heating are converted into their pyro or polyform, i.e. into the corresponding pyro- or poly-acids, for example phosphoric acid, sulfuric acid or boric acid. Those acids are especially suitable which pass into the pyro- or poly-acids when heated to high temperatures, for example 350° to 700° C. The acids are added to the catalysts, which if desired may be applied to carriers, preferably inert or neutral carriers, prior to the heating, which may be effected for example in a muffle furnace. The catalysts may be applied for example by treating the carrier substance with an aqueous solution of a metal salt to which there is preferably added the acid in question, for example phosphoric acid. For the preparation of the catalysts in this way, it is preferable to use the water-soluble salts of the metals, for example the nitrates or sulfates, because these salts have the property of being converted into the oxides when heated in a muffle furnace. The best results are achieved by the use of aqueous solutions of nitrates. It is also possible, however, to deposit the carbonates or hydroxides of the metals on the carrier by precipitation from their solutions. The carrier impregnated with the catalyst solution, after drying, can then be heated in a muffle furnace, for example at 350° to 700° C. Phosphoric acid is particularly suitable. When using phosphoric acid it is advantageous to heat at 500° to 650° C.

However, the metals applied to the carriers by the metal salt solution may also be heated, after having been heated to 650° C., for a long time at elevated temperature, for example at 400° to 700° C. in a muffle furnace, cooled and only then the acids added, preferably in aqueous solution by treatment of the catalyst with the solution. The catalyst thus treated is then dried and the applied acids converted by a subsequent heat treatment at lower temperatures into the corresponding pyro- or poly-acids. In this case a heat treatment at for example 200° to 250° C. is sufficient to impart to the catalyst the desired properties as regards strength and specific activity. By the heat treatment, the acids are converted into their pyro or poly form and thereby effect the binding of the active components to the carrier material, and structural changes which are important for stability and activity. Fuller's earth, silica strings, silica gel, aluminum oxide and silicates, for example magnesium silicate, may be used for the catalysts.

The catalysts, however, may also be used without carriers. In this case the components of the catalyst are mixed in the above-mentioned proportions, the amounts being with reference to the pure metals, 0.05 to 5%, advantageously 0.3 to 1.5%, of suitable acid being then added and the whole treated in a corresponding way at high temperature.

The catalysts may also take up an excess of free acid beyond the defined amount which they contain in the form of the pyro- or poly-acids.

The advantage of the use of these catalysts in the production of xylene diamines by hydrogenation of phthalodinitriles is not only to be seen in the increased life of these catalysts, but above all in the high activity which permits the carrying out of the hydrogenation at very low temperatures. Unlike the hydrogenation catalysts hitherto known, the catalysts do not promote the side reactions frequently occurring in the hydrogenation of phthalodinitriles and in which above all higher amines or methylbenzylamines are formed by the splitting off of ammonia. By the lower hydrogenation temperature when using catalysts containing poly- or pyro-acids, the speed of hydrogenation is increased to such an extent that the splitting off of ammonia in the intermediate stage of the hydrogenation can no longer take place. On the contrary, in the methods hitherto known there were obtained up to 20% or more of such undesirable by-products by the splitting off of ammonia.

In the process according to this invention it is preferable to work at moderately elevated temperatures, in general at 40° to 120° C. It is advantageous to work at 50° to 85° C. and at increased pressure. Since the hydrogenation speed increases markedly by increasing the hydrogen pressure, it is advantageous to use pressures of 100 to 500 atmospheres. It is preferable to work at 300 atmospheres.

The reaction is carried out in the presence of solvents. As solvents, those are suitable which have a high dissolving power for the initial materials at low temperatures, especially ammonia or the corresponding xylene diamine itself. It is especially favorable to use a mixture of xylene diamine with liquid ammonia. The ratio of xylene diamine to ammonia may be varied within wide limits. The solvent mixture may for example contain 10 to 80%, especially 55%, of ammonia. It is advantageous to use for the dissolution of the initial materials, a part of the discharge from the hydrogenation which ordinarily consists of 55% by weight of ammonia and 45% by weight of xylylene diamine. In such a mixture, the solubility of the dinitriles is extremely great even at 50° C. A mixture of xylylene diamine and ammonia, or xylylene diamine itself, however, may also be diluted by ordinary solvents, such as hydrocarbons, for example benzene. When carrying out the process in continuous operation, a part of the xylylene diamine formed, if desired together with recovered ammonia and/or fresh ammonia, is advantageously returned and used for dissolution of the initial materials. The use of xylylene diamine, if desired in admixture with ammonia, is preferable because no substances extraneous to the process pass into the reaction product. Furthermore, the use of this solvent has an inhibiting effect on the splitting off of ammonia occurring as a side reaction.

When returning a part of the xylylene diamine formed, it is advantageous to branch off 50 to 90%, especially 65 to 80%, of the xylylene diamine from the reaction product and use it for dissolving the initial materials. The reaction product, which is for example under a pressure of 300 atmospheres, is partly decompressed to a lower pressure, for example to 20 atmospheres. Of this partly decompressed reaction mixture, a part is branched off for the recovery of pure xylylene diamine and the remainder used for the dissolution of the phthalodinitrile in a suitable vessel. The dissolution of the initial material may take place either at atmospheric pressure and normal reaction temperature or also at a temperature higher than the reaction temperature and increased pressure so that higher concentrations are achieved. The more highly concentrated solution can then be diluted by simply bringing it together with a part of the hydrogenation mixture under high pressure.

The phthalodinitrile, however, may also be made into a paste with pure xylylene diamine or with a mixture of xylylene diamine and ammonia and this subsequently diluted with and dissolved in a part of the hydrogenation mixture which is under high pressure. The subsequent dilution with a part of the hydrogenation mixture under high pressure is advantageous from the point of view of heat economy because the ammonia remains in the liquid state. In a continuous process, only as much fresh phthalodinitrile is supplied to the reaction vessel as xylylene diamine is branched off to be recovered pure.

Xylylene diamines of very high purity are obtained which in particular do not contain any contamination by nuclear-hydrogenated products and therefore are extremely well suited as intermediate products for the plastics industry.

The following examples will further illustrate this invention but the invention is not restricted to these examples.

*Example 1*

256 grams of para-phthalodinitrile, 200 grams of liquid ammonia and 30 grams of a catalyst which contains 18% of cobalt, 0.5% of chromium and 2% of phosphoric acid as polyphosphoric acid and is deposited on silica strings, are heated to 60° C. in an 8 liter stirring autoclave at 300 atmospheres hydrogen pressure. After the absorption of hydrogen has ended, the catalyst is filtered off and the reaction mixture distilled under reduced pressure. At the boiling point 149° C. at 15 mm. Hg, 252 grams of pure para-xylylene diamine are obtained as a water-clear liquid of the freezing point 65° C. and the theoretical amine number of 825. The yield is 92.5% of the theory.

*Example 2*

128 grams of meta-phthalodinitrile, 900 grams of meta-xylylene diamine, 100 grams of liquid ammonia and 25 grams of a catalyst which contains 18% of cobalt, 0.7% of manganese and 1.5% of phosphoric acid in the form of polyphosphoric acid and has been applied to silica strings, are heated in an 8 liter stirring autoclave at 300 atmospheres hydrogen pressure at 75° C. while continually forcing in hydrogen. After the absorption of hydrogen has ended, the reaction vessel is decompressed, the reaction mixture filtered off from the catalyst and distilled under reduced pressure. At the boiling point 145° C. at 15 mm. Hg, there are obtained 127 grams of pure meta-xylylene diamine as a water-clear liquid with a freezing point of 14.5° C. The yield is 93.5% of the theory.

*Example 3*

128 grams of meta-phthalodinitrile, 225 grams of a mixture consisting of 50% by weight of meta-xylylene diamine and 50% by weight of liquid ammonia, and 50 grams of a catalyst containing 18% of cobalt, 1.0% of manganese and 1% of polyphosphoric acid on aluminum oxide, are heated at 70° C. in an 8 liter stirring autoclave at 300 atmospheres hydrogen pressure for 6 hours while continually forcing in hydrogen. After the absorption of hydrogen has ended, the catalyst is filtered off and the reaction mixture distilled under reduced pressure. At the boiling point 145° C. at 15 mm. Hg, there are obtained 128 grams of pure meta-xylylene diamine which has a freezing point of 14.5° C. and an amine number of 825. The yield is 94% of the theory.

*Example 4*

60 liters of a catalyst which has been applied to silica strings and which contains 18% of cobalt, 0.7% of manganese and 1% of polyphosphoric acid are charged into a high pressure tube having an internal diameter of 120 mm. and a length of 6,000 mm. In a suitable container, 7 kilograms of meta-phthalodinitrile are dissolved per hour in 7 kilograms of a mixture of 40% of liquid ammonia and 60% of meta-xylylene diamine at about 60° C. under pressure. The solution is led in the course of an hour into the high pressure tube by means of a pump. In the same pipe there are conveyed per hour 2.1 kilograms of liquid ammonia and 32 kilograms of a hydrogenation mixture consisting of 55% of ammonia and 45% of meta-xylylene diamine. The mixture is first preheated to 50° C. and then led into the catalyst zone. At the same time, for withdrawal of the heat of reaction, hydrogen under a pressure of 300 atmospheres is led in cocurrent with the liquid mixture in circulation through the catalyst zone. The reaction is immediately initiated. The hydrogenation mixture, of which 16.5 kilograms per hour are branched off for working up, is almost water-clear. After evaporation of the ammonia, there are obtained per hour by distillation under reduced pressure, 6.9 kilograms of pure xylylene diamine at the boiling point 145° C. at 15 mm. Hg; it has a freezing point of 14.5° C. The yield of pure xylylene diamine is 93% of the theory.

I claim:

1. In a method for the production of xylylene diamine by catalytic hydrogenation of a phthalodinitrile in the presence of a solvent the improvement of hydrogenating phthalodinitrile in the presence of a cobalt catalyst containing, in addition to at least one metal selected from the group consisting of chromium and manganese, from about 0.05% to about 5% of an acid selected from the group consisting of polysulfuric acid, polyboric acid, and polyphosphoric acid, said percentage being based on the total weight of the catalyst.

2. In a method as claimed in claim 1 the improvement which comprises using as the solvent for the phthalodinitrile a mixture of ammonia with xylylene diamine.

3. In a method for the production of xylylene diamine by catalytic hydrogenation of a phthalodinitrile in the liquid phase in the presence of a solvent the improvement of hydrogenating phthalodinitrile in the presence of a catalyst containing 10 to 20% of cobalt, 0.03% to 5% of a metal selected from the group consisting of chromium and manganese and 0.3 to 1.5% of phosphoric acid in the form of polyphosphoric acid.

4. The method as claimed in claim 1 wherein the hydrogenation is carried out under a hydrogen pressure of 100 to 500 atmospheres.

5. In a method for the production of an xylylene diamine by catalytic hydrogenation of a phthalodinitrile in the presence of a solvent the improvement of hydrogenating phthalodinitrile in the presence of a cobalt catalyst containing, in addition to at least one metal selected from the group consisting of chromium and manganese, from about 0.05% to about 5% of an acid selected from the group consisting of polysulfuric acid, polyboric acid, and polyphosphoric acid, said acid being produced by heating a compound selected from the group consisting of sulfuric acid, boric acid and phosphoric acid, which compound was supplied to said cobalt catalyst previous to said heating.

6. In a method for the production of an xylylene diamine by catalytic hydrogenation of a phthalodinitrile in the presence of a solvent the improvement of hydrogenating phthalodinitrile in the presence of a cobalt catalyst containing, in addition to at least one metal selected from the group consisting of chromium and manganese, from about 0.05% to about 5% of an acid selected from the group consisting of polysulfuric acid, polyboric acid, and polyphosphoric acid, said cobalt catalyst being obtained by applying to an inert carrier in an aqueous solution a water-soluble cobalt salt, at least one water-soluble salt of a metal selected from the group consisting of manganese and chromium, and a compound selected from the group consisting of sulfuric acid, boric acid and phosphoric acid, and heating the carrier thus treated to a temperature of between 350° and 700° C.

References Cited in the file of this patent

UNITED STATES PATENTS

| | | |
|---|---|---|
| 2,165,515 | Schmidt | July 11, 1939 |
| 2,773,902 | Heaton | Dec. 11, 1956 |
| 2,784,230 | Ferstandig | Mar. 5, 1957 |

FOREIGN PATENTS

| | | |
|---|---|---|
| 810,530 | Great Britain | Mar. 18, 1959 |

OTHER REFERENCES

Ephraim: "Inorganic Chemistry," 4th ed., pages 500–501 (1943).